United States Patent [19]
Cau

[11] Patent Number: 5,975,766
[45] Date of Patent: Nov. 2, 1999

[54] ARRANGEMENT OF A SHAFT IN A SUPPORT

[75] Inventor: Jose Paul Cau, Vierzon, France

[73] Assignee: Nadella, Cedex, France

[21] Appl. No.: 09/033,718

[22] Filed: Mar. 3, 1998

[30] Foreign Application Priority Data

Mar. 5, 1997 [FR] France .................................. 97 02617

[51] Int. Cl.⁶ .................................................. F16C 43/04
[52] U.S. Cl. ........................... 384/538; 384/518; 384/539
[58] Field of Search ..................... 384/517, 518, 384/537, 538, 539, 560, 563, 584, 585

[56] References Cited

U.S. PATENT DOCUMENTS

| | | | |
|---|---|---|---|
| 2,232,573 | 2/1941 | Pulleyblank | 384/518 |
| 2,269,132 | 1/1942 | Söderqvist | 403/369 |
| 3,807,820 | 4/1974 | Schuhmann | 384/538 |
| 3,917,425 | 11/1975 | Allaben, Jr. | 384/538 X |
| 3,953,142 | 4/1976 | Price et al. | 384/538 X |
| 4,514,109 | 4/1985 | McKenna | 403/370 |
| 4,545,627 | 10/1985 | Nakamura et al. | 384/585 |
| 4,979,834 | 12/1990 | Speich | 384/510 |
| 5,102,241 | 4/1992 | Pflungner | 384/538 X |
| 5,193,917 | 3/1993 | Adler et al. | 384/517 |
| 5,609,423 | 3/1997 | Jurik et al. | 384/518 |

FOREIGN PATENT DOCUMENTS

| | | | |
|---|---|---|---|
| 2 173 601 | 10/1973 | France . | |
| 3038112 | 4/1982 | Germany | 384/517 |
| 2 116 670 | 9/1993 | United Kingdom . | |

*Primary Examiner*—Thomas R. Hannon
*Attorney, Agent, or Firm*—Wenderoth, Lind & Ponack, L.L.P.

[57] ABSTRACT

A shaft (12) rotatively mounted in a support (14) by rolling elements comprising at least one first rolling bearing (18) providing an oblique contact surface axially biased in one direction by an elastic return force and in a direction opposed to the preceding direction by a thrust block (28) carried by the shaft (12). The block (28) is axially movable between a first position and a second position of application of a force opposed to the return force. The magnitude of the opposing force is greater in the second position of the block (28) than in the first position of this block (28). The block (28) is connected to the shaft by a connection (32) which is cooperative by the effect of friction with the shaft (12).

20 Claims, 7 Drawing Sheets

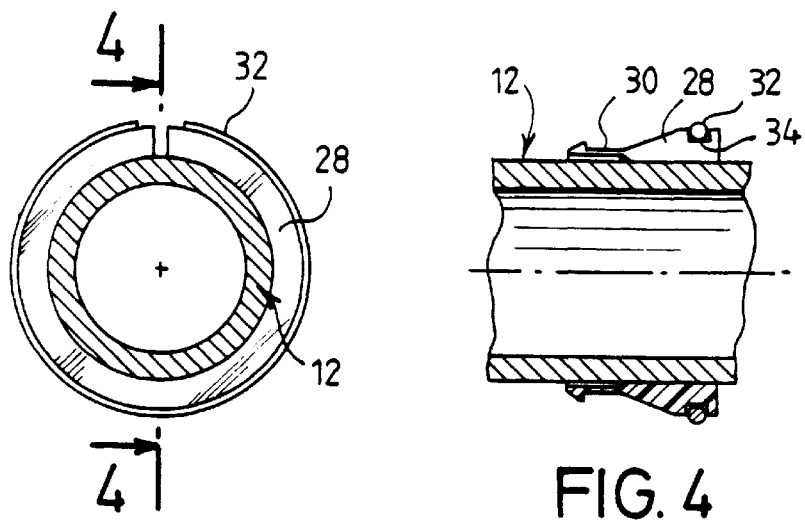
FIG. 3
FIG. 4
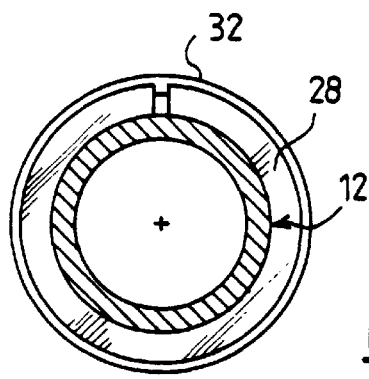
FIG. 5
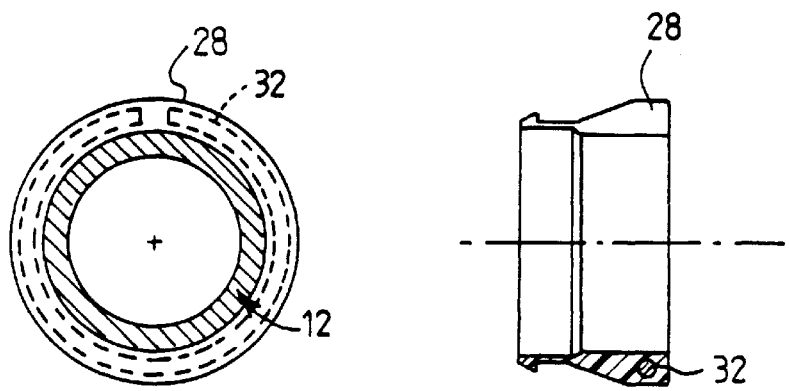
FIG. 6
FIG. 7

ARRANGEMENT OF A SHAFT IN A SUPPORT

BACKGROUND OF THE INVENTION

The present invention relates to an arrangement of a shaft in a support.

It in particular applies to the arrangement of a shaft of an automobile vehicle steering column in a column body forming a support.

There is already known in the art, in particular from U.S. Pat. No. 4,979,834, an arrangement of a shaft in a support, of the type in which the shaft is rotatively mounted in the support by rolling bearing means comprising at least one first rolling bearing providing an oblique contact surface axially biased in one direction by an elastic return force, and in a direction opposed to the foregoing direction, by a sleeve forming a thrust block carried by the shaft, this block being axially movable between the first and second positions of application of a force opposed to that of the return force, the magnitude of this opposing force being greater in the second position of the block than in the first position of the latter.

In the case of an automobile vehicle steering column arranged in accordance with the teaching of the foregoing document, the column shaft is rotatively mounted in the column body, forming a support, by means of a lower rolling bearing and an upper rolling bearing providing an oblique contact surface mounted in opposed relation in the body.

The lower rolling bearing is subjected to the elastic return force which is transmitted to the upper rolling bearing through the column body. The thrust block permits axially clamping the upper rolling bearing by opposing the return force.

The column shaft is assembled with the column body prior to the mounting of this column in the vehicle. In its first position, the thrust block exerts on the upper rolling bearing a clamping force which is relatively limited but sufficient to guarantee the cohesion of the assembly during the steering column handling or transporting operations.

After the mounting of the steering column in the vehicle, the steering wheel is fixed on the upper end of the shaft in contact with the thrust block in such a manner as to displace the latter toward its second position. In this second position, the block exerts on the upper rolling bearing a large clamping force which guarantees a firm assembly of the steering column in the vehicle.

The two positions of the thrust block therefore permit axially clamping the upper rolling bearing in two stages before and after the mounting of this column in the vehicle.

In U.S. Pat. No. 4,979,834, the thrust block is connected to the shaft by the clipping or latching of an inner annular projection of the block in an outer annular groove of the shaft. The width of the groove is sufficient to permit the axial sliding of the thrust block between its two positions. In order to guarantee the irreversibility of the clipping connection, the rolling bearing cooperates with a wedging effect with a tapered end of the thrust block to prevent the projection provided on this block from disengaging from the groove.

The means for connecting the thrust block with the shaft described in U.S. Pat. No. 4,979,834 has in particular the drawback of requiring further work on the shaft to form the clipping groove, for example a machining operation. Further, this groove creates a weakened region of the shaft.

SUMMARY OF THE INVENTION

The invention has in particular the object of overcoming the foregoing drawbacks while permitting a clamping of the upper rolling bearing of the column in two stages corresponding to two positions of the thrust block.

For this purpose, the invention provides an arrangement of a shaft in a support of the aforementioned type, characterized in that the block is connected to the shaft by connecting means which cooperate with the shaft by the effect of friction.

According to the features of different embodiments and variants of the invention:

The connecting means comprise an elastic, in particular split, gripping ring carried by the block and surrounding the inner surface of the block so as to clamp this inner surface against the outer surface of the shaft. The displacement of the block between its two positions occurs by a forced sliding of the inner surface of the block on the outer surface of the shaft.

The gripping ring is disposed in an outer peripheral groove of the block.

The gripping ring is inserted in the wall of the block.

The connecting means comprise a friction ring, in particular composed of an elastomer or metal, disposed in an inner peripheral groove of the block, cooperating by the effect of friction with the outer surface of the shaft. The displacement of the block between its two positions occurs by a forced sliding of the friction ring on the outer surface of the shaft.

The friction ring is composed of an elastomer and has a circular cross-sectional shape.

The friction ring is composed of metal, is in particular split, and has a rectangular cross-sectional shape.

The connecting means comprise an annular extension which is a force fit on the shaft and connected to the block by a breakable connection. The displacement of the block between its two positions occurs by a forced breaking of the breakable connection.

The extension axially extends an end of the block opposite to the rolling bearing.

The connecting means comprise a retaining ring which is force fit on the shaft and extends radially into a recess which is provided in the inner surface of the block and is defined by at least one axial abutment cooperating with the ring for defining the first position of the block. The axial dimension of the recess permits the sliding of the block between its two positions.

The retaining ring is defined by an end flange of a retaining sleeve which is surrounded by the block and is force fit on the shaft.

The retaining ring has a rectangular cross-sectional shape.

The block is axially split.

The block is provided with a generally tapered end for contact with the rolling bearing and converging toward the bearing. The tapered end is extended by an end part for clipping the block onto the inner peripheral contour of the rolling bearing so that the block is carried by the rolling bearing.

The block is composed of a synthetic or metallic material.

The shaft and the support form respectively a shaft and a body of a steering column of an automobile vehicle.

BRIEF DESCRIPTION OF THE DRAWINGS

A better understanding of the invention will be had from the following description which is given solely by way of example with reference to the accompanying drawings in which:

FIG. 3 is a sectional view taken on line 3—3 of FIG. 1;

FIG. 4 is a sectional view taken on line 4—4 of FIG. 3;

FIG. 5 is a view similar to FIG. 3 of a variant of the connecting means of the thrust block according to the first embodiment;

FIGS. 6 and 7 are views similar to FIGS. 3 and 4 of another variant of the connecting means of the thrust block according to the first embodiment;

DETAILED DESCRIPTION OF THE INVENTION

Figure 1:
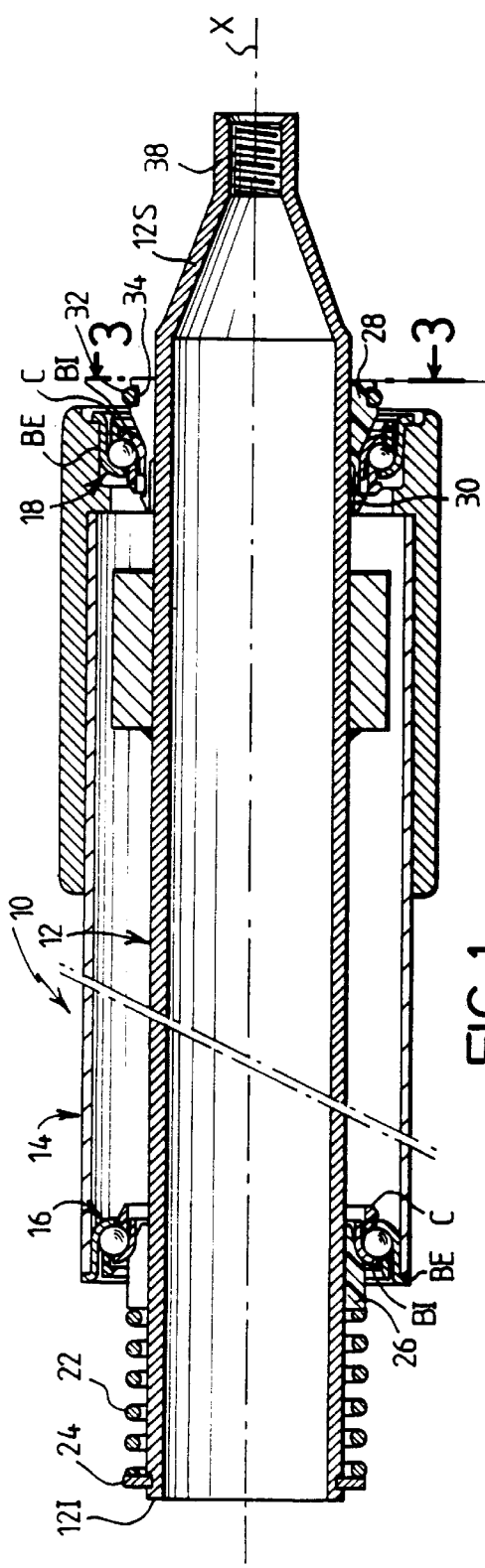
FIGS. 1 and 2 are axial sectional views of an automobile vehicle steering column shaft arranged, in a first embodiment of the invention, in a body of the column, the thrust block being in its first and second positions respectively.
Figure 2:
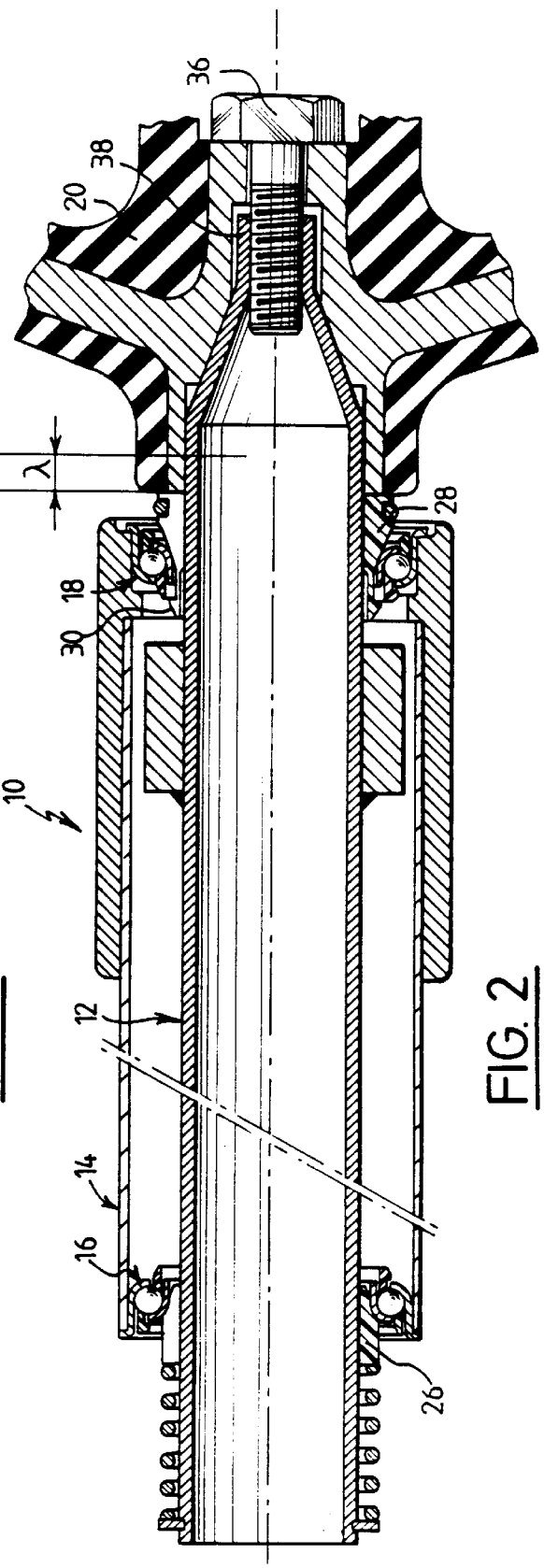

A motor vehicle steering column 10 is partly shown in FIGS. 1 and 2.

This column 10 comprises a shaft 12 arranged, according to a first embodiment of the invention, in a tubular column body 14 forming a support.

The shaft is mounted to be rotatable about its axis X in the body 14 by a pair of rolling bearings, for example ball bearings, namely a lower bearing 16 and an upper bearing 18. These bearings 16, 18 are of conventional type providing an oblique contact surface and are mounted in the known manner in opposed relation in the open ends of the body 14.

Shown in particular in FIG. 1 are the outer metal ring BE, the inner metal ring BI and the cage C of synthetic material of each rolling bearing 16, 18.

The shaft 12 comprises a convergent upper end 12S adapted to carry a steering wheel 20, and a lower end 12I adapted to be connected to other steering components of the vehicle.

The lower rolling bearing 16 is subjected to the elastic return force exerted by a compression spring 22 surrounding the lower end 12I of the shaft.

This spring 22 extends between a thrust ring 24 secured to the shaft 12 and a sleeve 26 forming a lower thrust block axially slidably mounted on the shaft 12.

The lower block 26, in particular composed of a synthetic or metallic material, is preferably axially split.

The lower block 26 comprises a first end forming a seat for the spring 22 and a second generally tapered end portion in contact with the inner ring BI of the lower rolling bearing 16.

The elastic return force exerted by the spring 22 is transmitted to the upper rolling bearing 18 through the body 14 of the column so as to axially bias the upper rolling bearing 18 in a first direction toward the upper end 12S of the shaft.

The upper rolling bearing 18 is also biased in a second direction opposed to the preceding direction toward the end 12I of the shaft by an upper sleeve 28 forming an upper thrust block.

The upper block 28 is mounted on the shaft 12 so as to be axially movable between two positions for application of a force opposed to the return force.

FIG. 1 shows the upper block 28 in a first position permitting the assembly of the shaft 12 with the body 14 prior to the mounting of the steering column in the vehicle.

FIG. 2 shows the upper block 28 in the second position after a displacement of the block through a distance λ from its first position toward the lower end 12I of the shaft.

The upper block 28 is displaced toward this second position, after the mounting of the steering column 10 in the vehicle, by means of the steering wheel 20, as will be described hereinafter.

The displacement of the upper block 28 between its first and second positions compresses the spring 22 so that the magnitude of the force opposing the return force exerted by the upper block 28 is greater in the second position of block 28 than in the first position thereof.

The upper block 28, in particular is composed of a synthetic material, is axially split to permit its mounting on the shaft and the taking up of clearances between the block and the elements with which it is in contact.

The upper block 28, shown in more detail in FIG. 4, comprises a first end for direct or indirect contact with the steering wheel 20 and a second end for contact with the upper rolling bearing 18. This second end has a generally tapered shape converging toward the upper rolling bearing 18 and is extended by an end portion 30 for clipping or latching the block 28 on the inner peripheral contour of the inner ring BI of the upper rolling bearing 18. In this way, the upper block 28 is carried by the upper rolling bearing 18.

The upper block 28 is connected to the shaft 12 by connecting means which cooperate by the effect of friction with this shaft 12.

In the first embodiment illustrated in FIGS. 1 and 2, the connecting means of the upper block 28 comprise an elastic gripping ring 32 carried by the upper block 28 and surrounding the inner surface of this block 28 so as to clamp this inner surface against the outer surface of the shaft 12.

The displacement of the upper block 28 between its two positions occurs by a forced sliding of the inner surface of the upper block 28 on the outer surface of the shaft 12.

FIGS. 1 to 4 represent the ring 32 disposed in an outer peripheral groove 34 provided in the upper block 28. The ring 32 is split as clearly shown in FIG. 3.

FIG. 5 represents a variant in which the ring 32 is continuous (non split).

FIGS. 6 and 7 represent another variant in which the split ring 32 is disposed within the wall of the upper block 28.

The upper block 28, movable between two positions, permits clamping the upper rolling bearing 18 in two stages.

The first stage corresponds to the assembly of the shaft 12 with the column body 14 prior to the mounting of column 10 in the vehicle.

The upper block 28 is placed in its first position so as to axially clamp the upper rolling bearing 18 in a manner which is relatively limited but sufficient to guarantee the cohesion of the assembly when effecting the handling and transporting operations on the steering column 10.

The second stage corresponds to the fixing of the steering wheel 20 on the upper end 12S of the shaft after having mounted the steering column in the vehicle. The steering wheel 20 is fixed in the known manner by screwing a screw 36 in a tapped hole of an end portion 38 extending from the upper end 12S of the shaft.

In the course of this screwing operation, the steering wheel 20 in direct or indirect contact with the upper block 28, urges the latter to its second position by forcing it to slide along the shaft 12 and overcome the frictional forces retaining the upper block 28 in its first position. It will be noted that these frictional forces must be controlled in such manner as to avoid hindering the fixing of the steering wheel 20.

In its second position, the upper block 28 exerts a large clamping force on the upper rolling bearing 18 and guarantees a firm assembly of the steering column.

Figure 8:
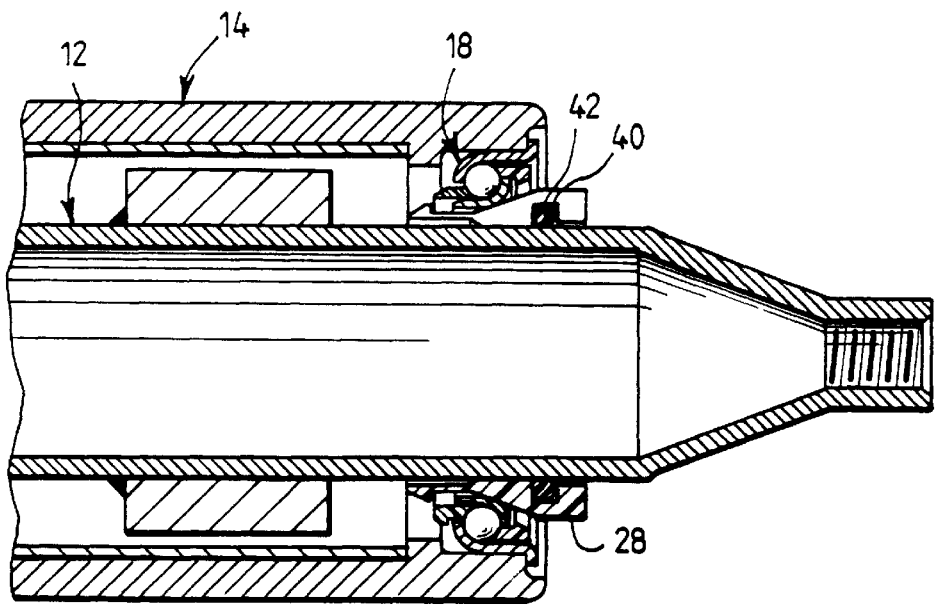
FIGS. 8 and 9 are views similar to FIGS. 1 and 2, in which the shaft is arranged in the column body according to a second embodiment of the invention.
Figure 9:
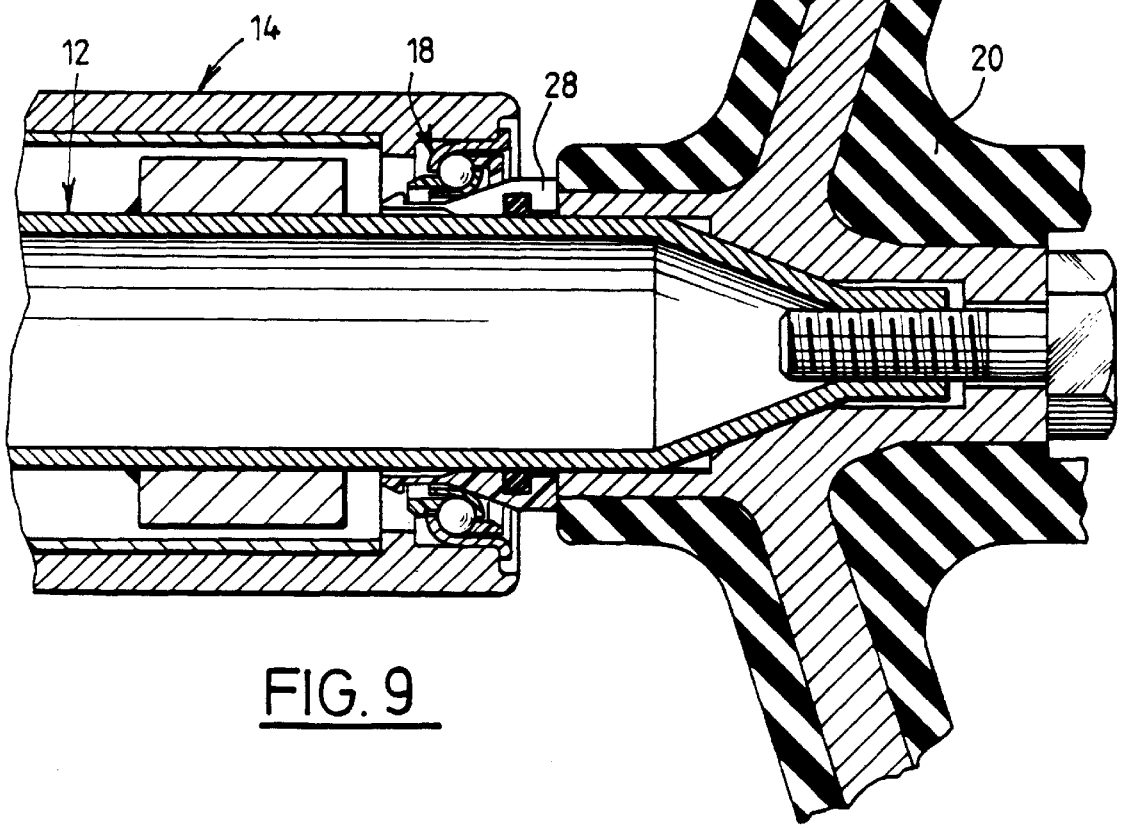

FIGS. 8 and 9 represent the shaft 12 arranged in the column body 14 according to a second embodiment of the invention.

In this case, the frictional connecting means between the upper block 28 and the shaft 12 comprise a friction ring 40 disposed in an inner peripheral groove 42 provided in the upper block 28.

The ring 40 cooperates by the effect of friction with the outer surface of the shaft 12. The displacement of the upper block 28 between its two positions occurs by a forced sliding of the ring 40 on the outer surface of the shaft 12.

By way of an example, the ring 40 shown in FIGS. 8 and 9 is composed of an elastomer and has a circular cross-sectional shape.

Figure 10:
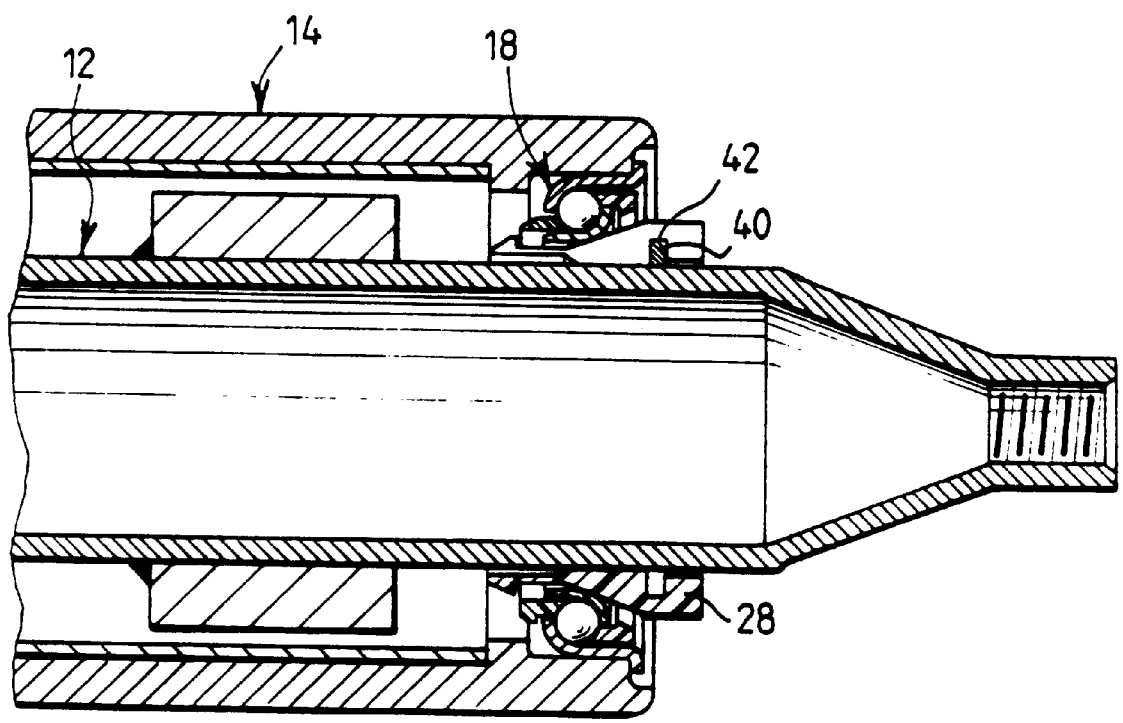
FIG. 10 is a view similar to FIG. 8 of a variant of the connecting means of the thrust block according to the second embodiment of the invention.

In a variant, the ring 40 is composed of a metallic material, is in particular split, and has a rectangular cross-sectional shape, as represented in FIG. 10.

In the second embodiment, the displacement of the upper block 28 between its two positions occurs in a manner similar to that described in the first embodiment.

Figure 11:
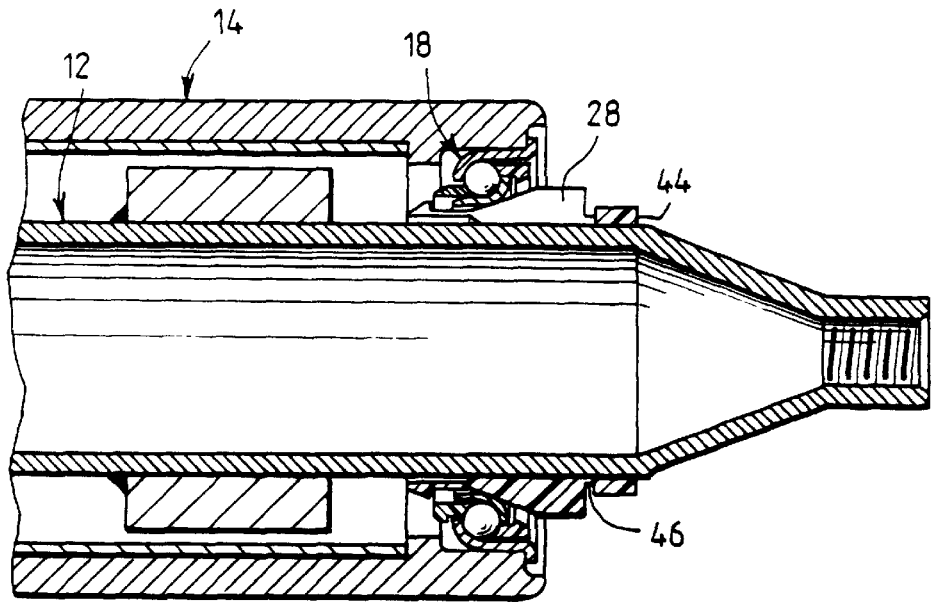
FIGS. 11 and 12 are views similar to FIGS. 1 and 2, in which the shaft is arranged in the column body according to a third embodiment of the invention.
Figure 12:
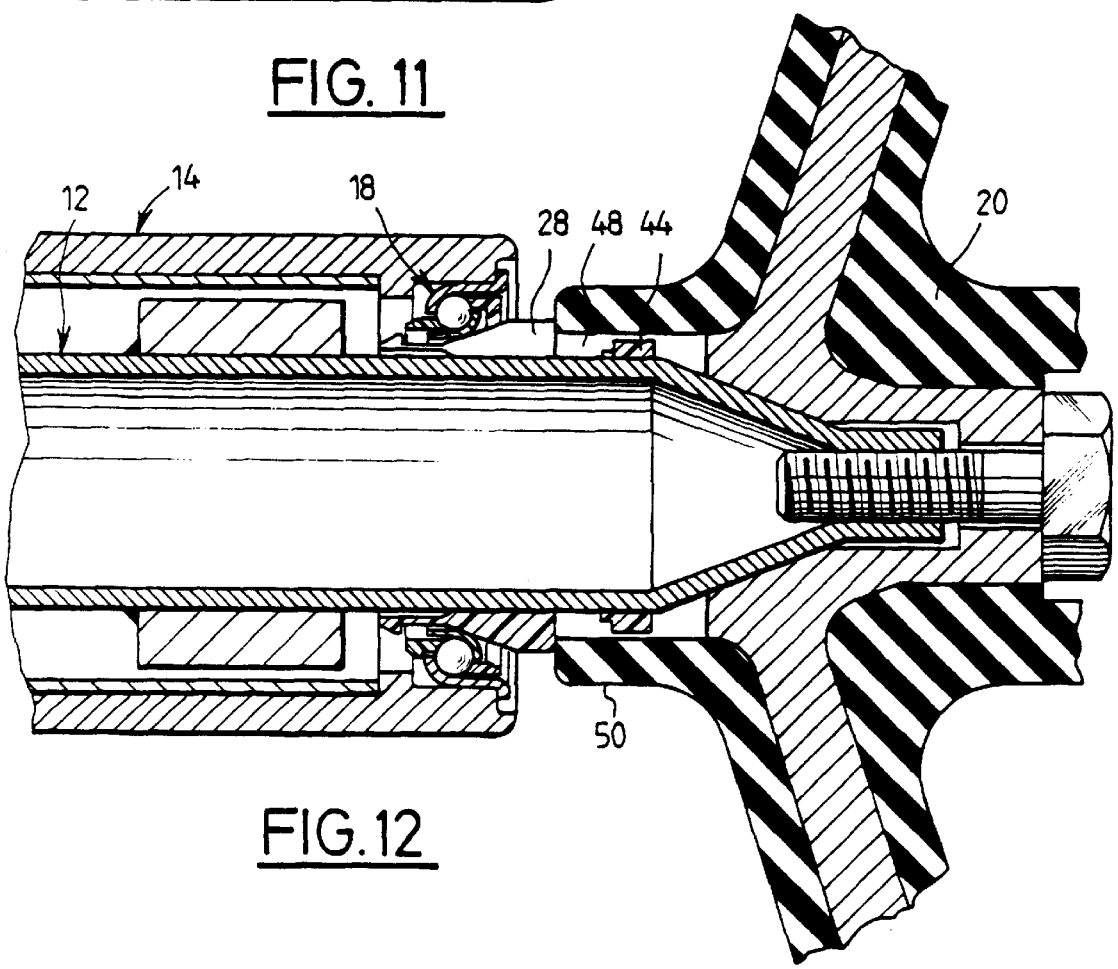

FIGS. 11 and 12 represent the shaft 12 arranged in the column body 14 according to a third embodiment of the invention.

In this case, the connecting means, acting by the effect of friction between the upper block 28 and the shaft 12, comprise an annular extension 44 of this upper block 28.

This extension 44, connected to the upper block 28 by a breakable connection 46, is force fit on the shaft. The upper block 28, the extension 44 and the connection 46 are made in one piece.

By way of example, as shown in FIGS. 11 and 12, the extension 44 axially extends one end of the upper block 28 which is remote from the upper rolling bearing 18.

As in the foregoing embodiments, the upper block 28 is axially split. However, the extension 44 is continuous (non split).

It will be observed that the extension 44 is radially set back with respect to the end of the upper block 28 to which it is connected, so as to permit the contact of the steering wheel 20 with this connecting end.

When the steering wheel 20 is screwed on the shaft 12, the force exerted by the steering wheel 20 on the upper block 28 separates block 28 from the extension 44 by the breaking of the breakable connection 26, as shown in FIG. 12.

After the breaking of the connection 46, the extension 44 remains substantially in its initial position corresponding to the first position of the upper block 28, while the latter moves to its second position.

It will be observed that after the separation from the upper block 28, the extension 44 is disposed in an inner recess 48 of a hub 50 of the steering wheel which is in contact with the upper block 28.

Figure 13:
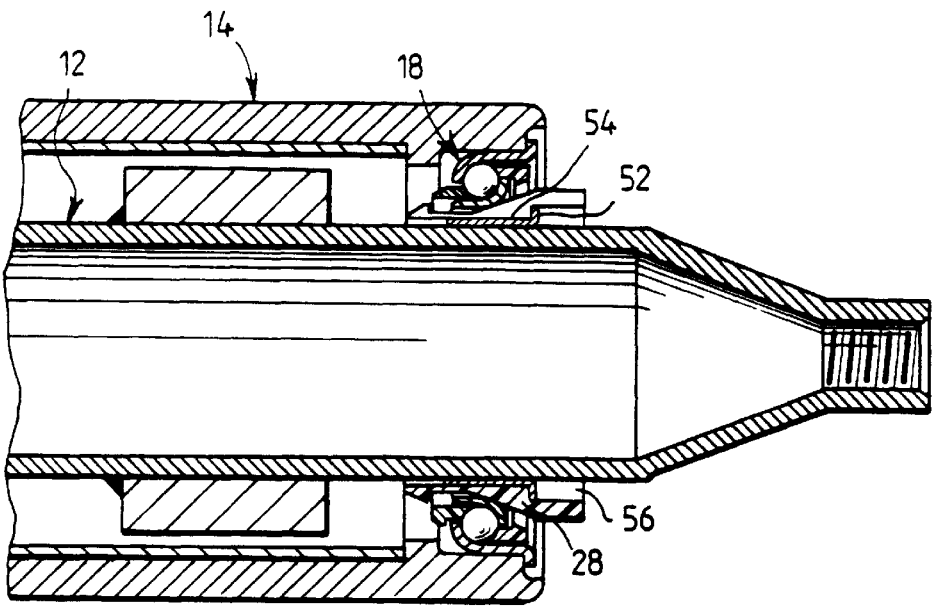
FIGS. 13 and 14 are views similar to FIGS. 1 and 2, in which the shaft is arranged in the column body according to a fourth embodiment of the invention.
Figure 14:
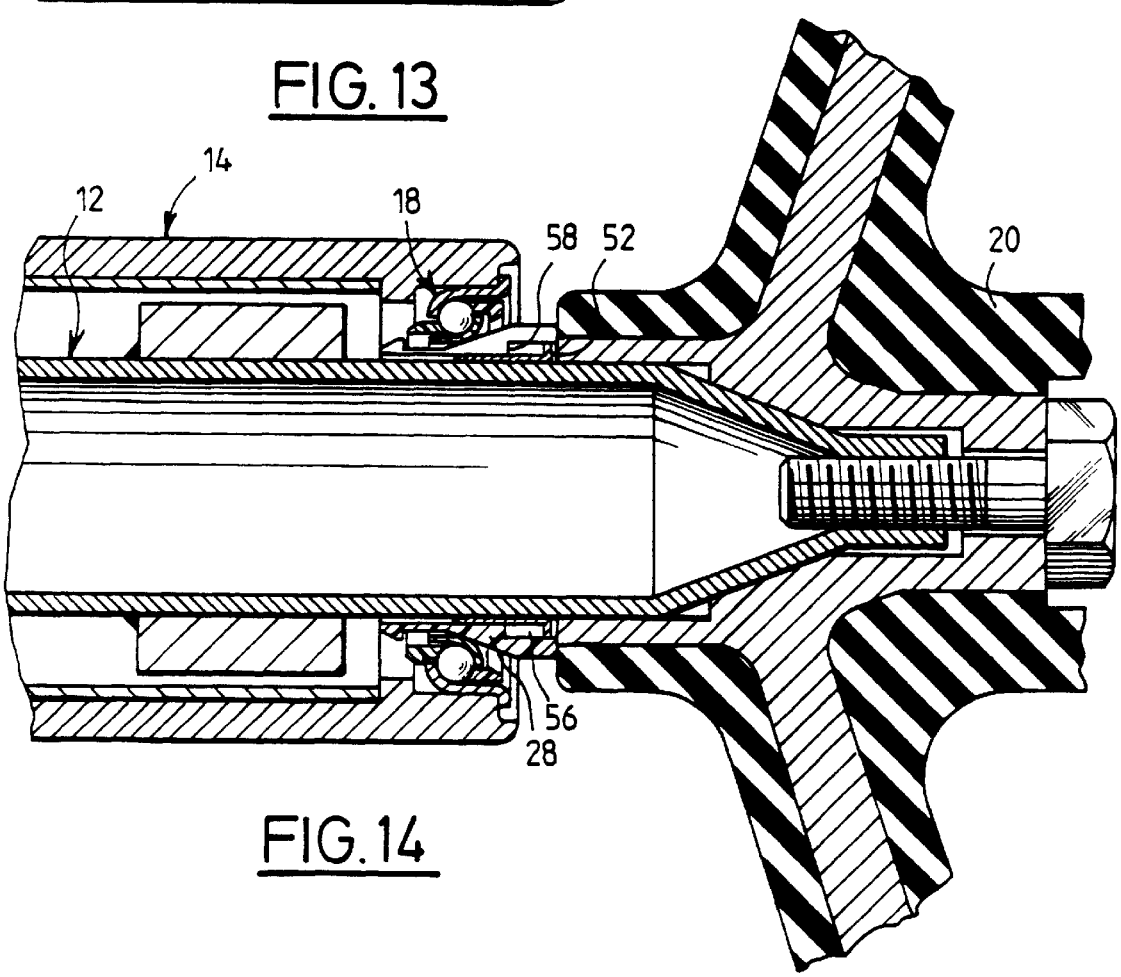

As shown in FIGS. 13 and 14, the shaft 12 is arranged in the column body 14 in accordance with a fourth embodiment of the invention.

In this case, the connecting means, connecting by the effect of friction the upper block 28 to the shaft 12, comprise a preferably metallic retaining ring 52 which is a force fit on the shaft 12.

The ring 52 comprises for example an end flange of a sleeve 54 which is force fit on the shaft 12 and surrounded by the upper block 28, as shown in FIGS. 13 and 14.

Figure 15:
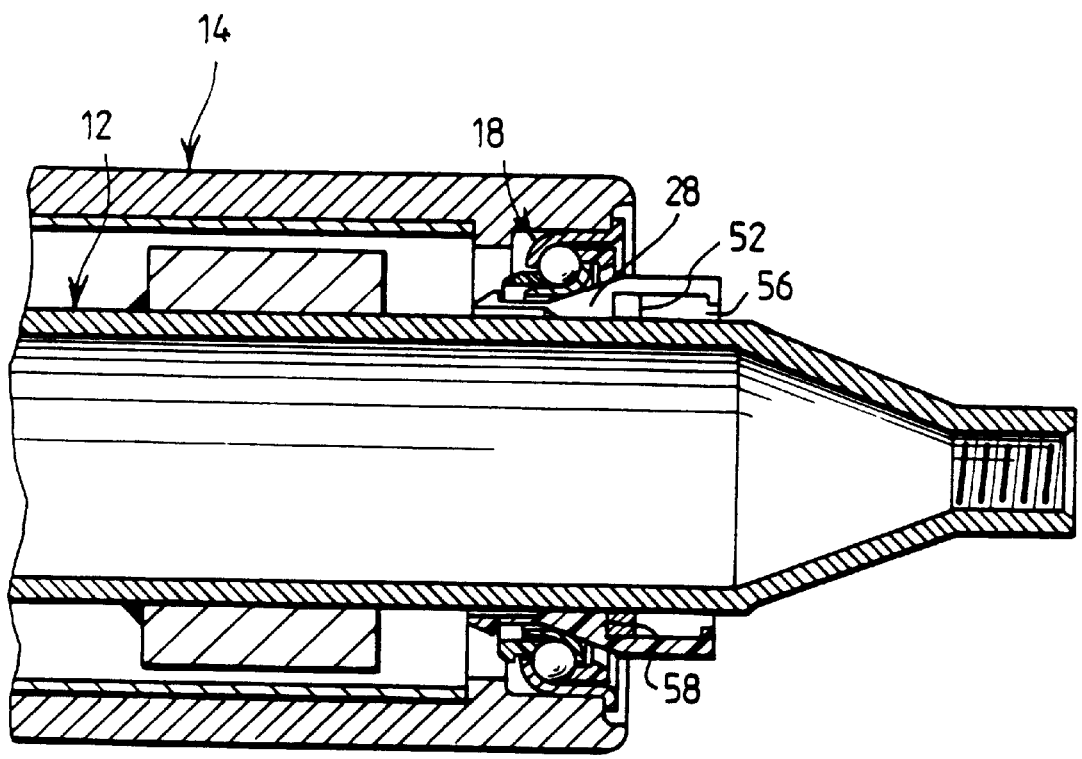
FIG. 15 is a view similar to FIG. 13 of a variant of the connecting means of the thrust block according to the fourth embodiment of the invention.

FIG. 15 shows a variant of the retaining ring 52. In this variant the ring 52 has a rectangular cross-sectional shape.

The ring 52 extends radially in a recess 56 provided in the inner surface of the upper block 28. This recess 56 is defined by at least one axial abutment 58 cooperating with the ring 52 for defining the first position of the upper block 28.

The axial dimension of the recess 56 permits the sliding of the upper block 28 between its first position shown in FIG. 13, and its second position such as that shown in FIG. 14.

The scope of the invention is not intended to be limited to the embodiments described hereinbefore.

In particular, the lower block 16 may be replaced by a block identical to the upper block 28 so as to homogenize the various elements constituting a steering column.

Further, note that the application of the invention is not limited solely to a vehicle steering column but can be used in any arrangement of a shaft in a support.

The invention has many advantages.

In particular, it permits connecting the upper thrust block 28 to the shaft 12 with no additional work required on the shaft, for example with no additional machining, while allowing the thrust block to move between two positions and axially clamp in two stages the rolling bearing in contact with the block.

Further, the upper thrust block may be optionally clipped or latched in the corresponding rolling bearing, which simplifies the mounting of the shaft in the rolling bearings of the support.

What is claimed is:

1. An arrangement of a shaft in a support, comprising in combination:

rolling bearing means rotatably mounting said shaft in said support, said rolling bearing means comprising at least one rolling bearing providing an oblique contact surface;

means for exerting an elastic axial return force for axially biasing said at least one rolling bearing in a first direction along said shaft;

a sleeve forming a thrust block carried by said shaft so as to be axially movable between a first position and a second position for exerting a second force, which is opposed to said first force, for biasing said at least one rolling bearing in a second direction which is opposed to said first direction, said thrust block comprising an end portion having a generally tapered shape which converges toward said at least one rolling bearing, and an end part extending from said tapered end portion for clipping said block onto an inner peripheral contour of said at least one rolling bearing, wherein said block is carried by said at least one rolling bearing, and said opposing second force has a magnitude which is greater in said second position of said block than in said first position of said block; and connecting means cooperating with said shaft by the effect of friction for connecting said block to said shaft.

2. The arrangement as claimed in claim 1, wherein said connecting means comprises an elastic gripping ring carried by said block and surrounding the inner surface of said block for clamping said inner surface against an outer surface of said shaft, the displacement of said block between said first and second positions thereof occurring by a forced sliding of said inner surface of said block on said outer surface of said shaft.

3. The arrangement as claimed in claim 2, wherein said gripping ring is split.

4. The arrangement as claimed in claim 2, wherein said block has an outer peripheral groove in which said gripping ring is disposed.

5. The arrangement as claimed in claim 2, wherein said gripping ring is disposed within a wall of said block.

6. The arrangement as claimed in claim 1, wherein said connecting means comprises an inner peripheral groove in said block, and a friction ring disposed in said inner peripheral groove and held in position on an outer surface of said shaft by the effect of friction, the displacement of said block between said first and second positions thereof occurring by a forced sliding of said friction ring along said outer surface of said shaft.

7. The arrangement as claimed in claim 6, wherein said friction ring is composed of elastomer.

8. The arrangement as claimed in claim 7, wherein said friction ring has a circular cross-sectional shape.

9. The arrangement as claimed in claim 6, wherein said friction ring is composed of metal.

10. The arrangement as claimed in claim 9, wherein s aid friction ring has a rectangular cross-sectional shape.

11. The arrangement as claimed in claim 10, wherein said friction ring is split.

12. The arrangement as claimed in claim 1, wherein said connecting means comprises an annular extension of said block which is force fit on said shaft, and a breakable connection connecting said extension to said block so that the displacement of said block between said first and second positions thereof occurs by a forced breaking of said breakable connection.

13. The arrangement as claimed in claim 12, wherein said extension axially extends an end of said block which is remote from said at least one rolling bearing.

14. The arrangement as claimed in claim 1, wherein said connecting means comprises a recess in the inner surface of said block and a retaining ring which is force fit on said shaft and extends radially into said recess, said recess being axially defined by at least one axial abutment which cooperates with said ring for defining said first position of said block, said recess having an axial dimension which permits the sliding of said block between said first and second positions thereof.

15. The arrangement as claimed in claim 14, wherein said retaining ring is defined by an end flange of a retaining sleeve which is surrounded by said block and is force fit on said shaft.

16. The arrangement as claimed in claim 14, wherein said retaining ring has a rectangular cross-sectional shape.

17. The arrangement as claimed in claim 1, wherein said block is axially split.

18. The arrangement as claimed in claim 1, wherein said block is formed of a synthetic material.

19. The arrangement as claimed in claim 1, wherein said block is formed of a metallic material.

20. The arrangement as claimed in claim 1, wherein said shaft and said support form a shaft and a body of a steering column of an automobile vehicle, respectively.

* * * * *